United States Patent
Narin et al.

(10) Patent No.: US 7,758,067 B2
(45) Date of Patent: Jul. 20, 2010

(54) MOTOR VEHICLE WITH KNEE AIRBAG

(75) Inventors: Muhammed Ali Narin, München (DE); Arno Gruber, Neufahrn (DE)

(73) Assignee: Autoliv Development AB, Vargarda (SE)

( * ) Notice: Subject to any disclaimer, the term of this patent is extended or adjusted under 35 U.S.C. 154(b) by 586 days.

(21) Appl. No.: 11/596,658

(22) PCT Filed: May 21, 2005

(86) PCT No.: PCT/EP2005/005533

§ 371 (c)(1),
(2), (4) Date: Nov. 16, 2006

(87) PCT Pub. No.: WO2005/115807

PCT Pub. Date: Dec. 8, 2005

(65) Prior Publication Data

US 2008/0067790 A1    Mar. 20, 2008

(30) Foreign Application Priority Data

May 28, 2004    (DE) .................... 10 2004 026 202

(51) Int. Cl.
  B60R 21/16    (2006.01)
  B60R 21/231   (2006.01)
(52) U.S. Cl. .................... 280/730.1; 280/732; 280/751; 280/752
(58) Field of Classification Search ............ 280/730.1, 280/732, 751, 752
See application file for complete search history.

(56) References Cited

U.S. PATENT DOCUMENTS 3,784,223 A * 1/1974 Hass et al. ............ 280/730.1
4,262,931 A * 4/1981 Strasser et al. ............ 280/729
5,324,070 A    6/1994 Kitagawa et al.

(Continued)

FOREIGN PATENT DOCUMENTS

DE    2109637    * 9/1972

(Continued)

OTHER PUBLICATIONS

International Search Report for PCT/EP2005/005533 (in English) and Written Opinion of International Search Authority (in German), ISA/EP, Rijswijk, mailed Aug. 24, 2005.

Primary Examiner—Paul N Dickson
Assistant Examiner—Karen Jane J Amores
(74) Attorney, Agent, or Firm—Harness, Dickey & Pierce, P.L.C.

(57) ABSTRACT

A knee airbag is described which is located in front of a front seat (S) in the footwell, whereby this footwell is limited on a first side by the vehicle inner structure (F) and on the side lying opposite the first side is limited by a center console (M). When it is completely filled and free from external forces, this knee airbag (10) exhibits a certain maximum width (b) horizontally and perpendicularly to the longitudinal axis of the motor vehicle (f). In order to improve the safety of the vehicle occupants in case of a laterally-offset frontal collision, knee airbag (10) is arranged in the footwell in such a way that its maximum width (b) in inflated state is greater than the separation (a) between vehicle inner structure (F) and center console (M).

21 Claims, 2 Drawing Sheets

U.S. PATENT DOCUMENTS

Figure 1:
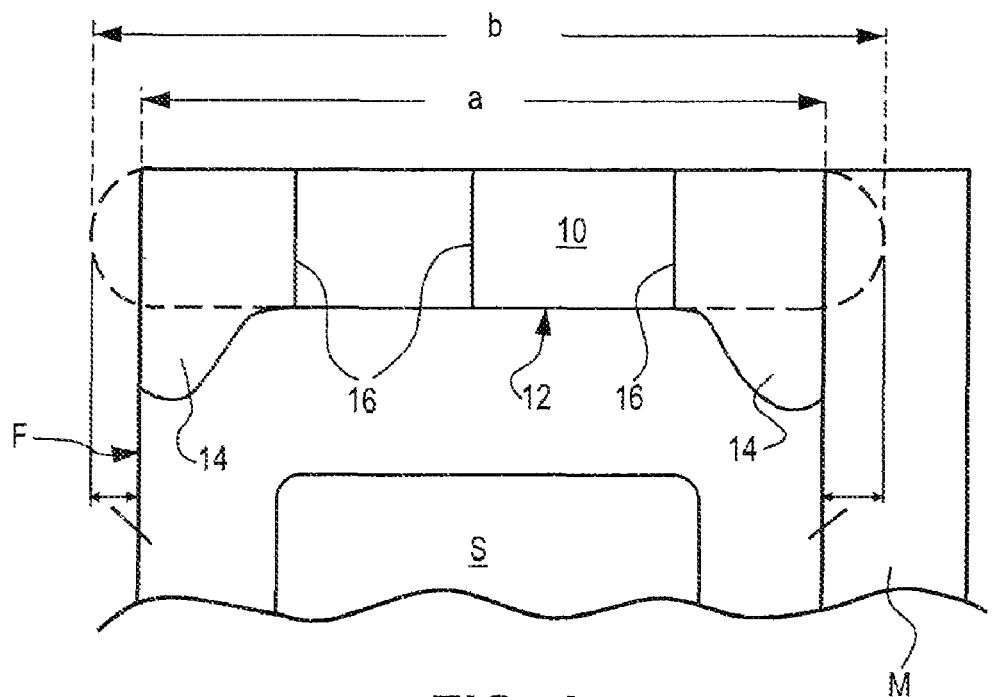

| | | | |
|---|---|---|---|
| 6,336,653 B1 * | 1/2002 | Yaniv et al. | 280/730.1 |
| 6,499,765 B2 * | 12/2002 | Hawthorn et al. | 280/743.1 |
| 6,942,245 B2 * | 9/2005 | Takimoto et al. | 280/730.1 |
| 7,185,912 B2 * | 3/2007 | Matsuura et al. | 280/728.3 |
| 7,455,315 B2 * | 11/2008 | Yokoyama | 280/730.1 |
| 2002/0171230 A1 * | 11/2002 | Takimoto et al. | 280/730.1 |
| 2002/0171231 A1 * | 11/2002 | Takimoto et al. | 280/730.1 |
| 2005/0073134 A1 | 4/2005 | Matsuura et al. | |
| 2006/0102413 A1 * | 5/2006 | Ootani et al. | 180/274 |

FOREIGN PATENT DOCUMENTS

| | | |
|---|---|---|
| DE | 43 01 906 A1 | 8/1993 |
| DE | 199 28 784 A1 | 12/1999 |
| DE | 103 32 594 A1 | 3/2004 |
| GB | 2340458 A | 2/2000 |

* cited by examiner

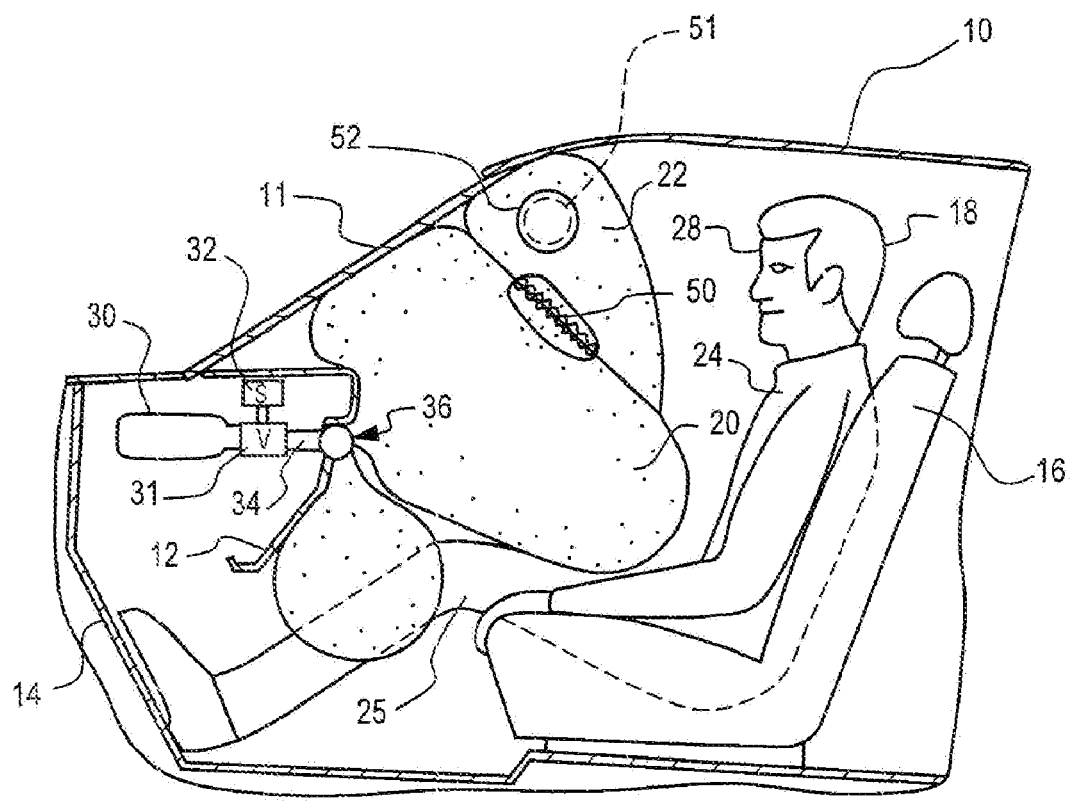
FIG. 3 (STATE OF THE ART)
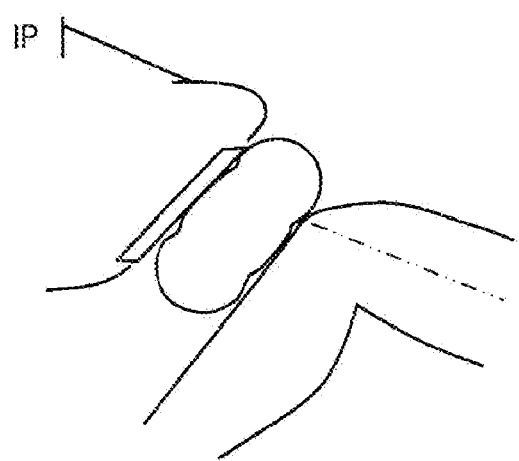
FIG. 4 (STATE OF THE ART)

MOTOR VEHICLE WITH KNEE AIRBAG

TECHNICAL AREA OF THE INVENTION

The invention relates to a motor vehicle with at least one knee airbag.

Use of knee airbags in motor vehicles is known. Such knee airbags serve, together with a driver or passenger airbag and a seat belt system, to protect the vehicle occupants in case of a frontal collision or a laterally-offset frontal collision. In such a case, the knee airbag has two main tasks: on the one hand it should prevent the knee-shin area of the occupant from striking the inner structure of the vehicle. Furthermore, a knee airbag has the task of holding the occupant in his or her seating position in case of a frontal impact. This task is normally shared with the seat belt system; the knee airbag should, however, ideally be designed in such a way that it succeeds in holding the occupant in position—at least to a limited extent—even if the seat belt is not being worn.

STATE OF THE ART

Knee airbags which have existed up to now are primarily designed in order to retain the occupant in the longitudinal direction of the vehicle. For this purpose, knee airbags are generally dimensioned and arranged in such a way that, when the airbag is fully filled, their impact surface is located a short distance in front of the knee-shin area of a standard dummy in standard position, or touches this area lightly. This means that the knee-shin area is only subject to light loads from the knee airbag itself, and only a relatively small airbag volume is required. A disadvantage of such a configuration is that in the case of a laterally-offset frontal collision, no satisfactory protective effect is demonstrated. Therefore, it can occur that the knees of the occupant slide off along the impact surface of the knee airbag and therefore come into contact with the inner structure of the vehicle. Furthermore, such an airbag can only inadequately prevent displacement of the pelvis and the upper body in case of a diagonal impact, so that, for example, in the worst case the head can also come into contact with the A pillar. This problem occurs particularly in the case of vehicle occupants who are not wearing seat belts.

DT 2 109 637 C3 shows among other things a knee airbag which expands so far into the interior of the vehicle that it embraces almost the entire knee-shin area of the vehicle occupant. Although such a knee airbag certainly offers a good retention effect, the fact that very large loads are placed on the occupant because of the airbag as such also has to be accepted. It is also difficult to fill such a large-volume airbag.

OBJECT OF THE INVENTION

Starting from this point, the task of the invention is to further develop a motor vehicle with at least one knee airbag in such a way that, using simple means, improved protection of the occupant in case of a laterally-offset frontal impact is achieved.

In most motor vehicles, the footwell assigned to the vehicle occupant sitting at the front, in other words the area of the vehicle in front of the front seat, is limited on the one side by the inner structure of the vehicle and on the other side by a centre console. According to the invention, the knee airbag is now formed in such a way that its width, if it could expand unhindered, would be greater than the space available to it between vehicle inner structure, for example the driver/passenger door, and the centre console. The superfluous volume of the knee airbag therefore escapes to the inside, so that bolster-shaped areas form on the sides, which leads to sideways retention of the knees. The inflated knee airbag is therefore contoured, without the need for complicated shaping of the airbag cover. The desired contouring effect can be improved still further by use of capture tapes running through the airbag.

Because the bolster-shaped areas are supported on the vehicle inner structure and the centre console, very good shape stability results. The knee airbag cannot escape, so that there are superb retention effects in case of force influence which goes crossways to the front through the knee-shin area of the occupants.

The fact that the knee airbag is wedged in also prevents a knee from striking through between the airbag and a side structural barrier.

In a preferred embodiment, the knee airbag is dimensioned and positioned in such a way that the knee-shin area of the relevant vehicle occupants are embraced by the impact surface of the airbag.

The invention is now described in more detail with reference to the figures. The figures are as follows:

SHORT DESCRIPTION OF THE DRAWINGS

Figure 2:
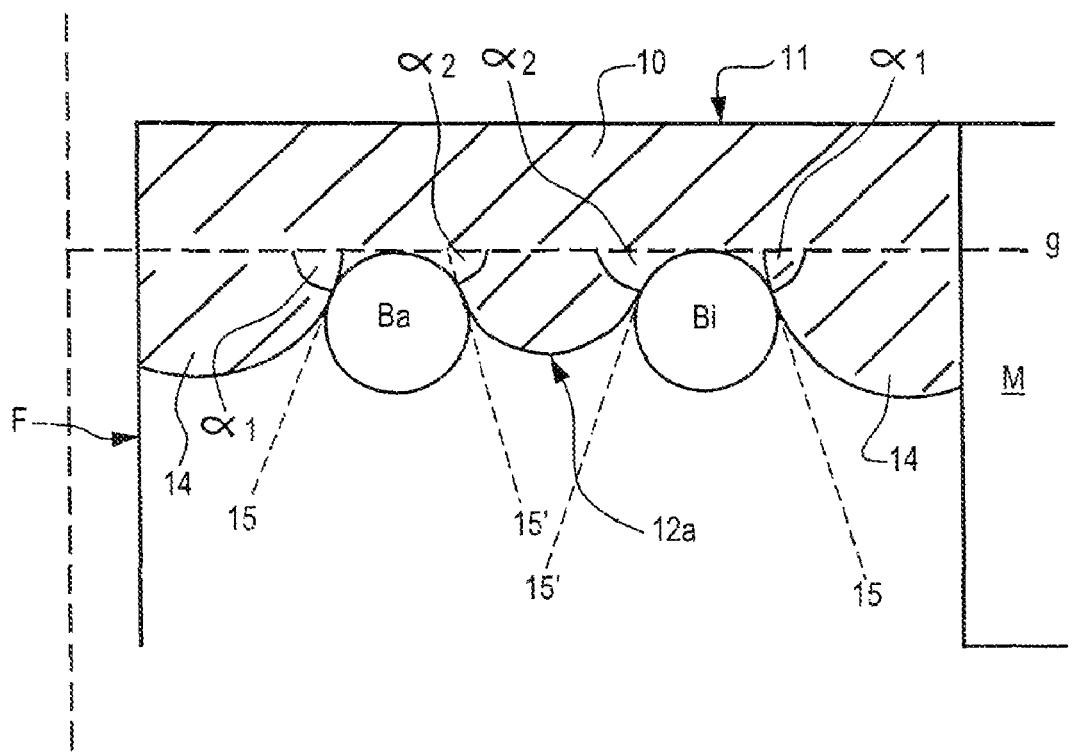

FIG. 1 A schematic representation of a knee airbag fully expanded in the footwell, FIG. 2 A schematic representation of a preferred embodiment of a knee airbag, including the position of the knees of a vehicle occupant, FIGS. 3 and 4 Illustrations of knee airbags according to the state of the art.

DESCRIPTION OF PREFERRED EMBODIMENTS

FIG. 1 shows a schematic view of a part of a front seat S and the footwell in front of it with a knee airbag 10 in a horizontal section. Knee airbag 10, inflated by a gas generator which is not shown, is fully expanded. As can be seen, knee airbag 10 forms bolster-shaped areas 14 on its sides. These bolster-shaped areas occur because the maximum width b, which the knee airbag 10 would have, if it could unfold freely, is bigger than the space available to it between vehicle inner structure F and inner side of centre console M. The shape which knee airbag 10 would have if it could unfold freely, is shown by a dotted line. Preferably, width b of the knee airbag is 30 to 100 mm larger than separation a which is available.

The bolster-shaped areas 14 which form mean that the occupant is better supported if he or she moves crossways, which on the one hand prevents contact of the knees with the centre console or the vehicle inner structure, and sideways slipping through between knee airbag and, for example, the inner cladding of the door, and furthermore diminishes the risk of head contact with the A-pillar, in particular if the vehicle occupants are not wearing seat belts.

In order to improve the form of side bolsters 14, in the central area capture tapes 16 extend from the base surface 11 to the impact surface 12 of knee airbag 10. The capture tapes limit the thickness of knee airbag 10 in its central area. Without capture tapes 16, only small bolsters are formed, or the thickness of the entire knee airbag 10 increases. The other benefits, in particular better side support and prevention of slipping through at the side, remain.

A preferred embodiment of the invention is shown in FIG. 2. Knee airbag 10, whose width is also here selected to be greater than the available separation between vehicle inner structure F, which in this area is mainly formed of the internal door cladding, and centre console M. Furthermore, the knee airbag is dimensioned and positioned in such a way that it embraces the knee-shin areas of legs B of the vehicle occupant—who is in his standard seating position—on the outside, at least in part. This embrace ideally occurs with regard to both the inner and the outer knee-shin areas. In order to achieve the best-possible results, the degree to which the legs are embraced should lie within a certain range. This degree of the embrace can be defined with the help of a 50% H III dummy in its standard seating position, whereby the dummy sits in its so-called H point:

FIG. 2 shows the knee-shin area of the above-defined dummy. In order, on the diagram, to define the degree of the embrace, the straight line g is used, which as a plane extends horizontally and perpendicularly to longitudinal vehicle axis f. Angle α is now used as a measure of the degree of the embrace, being the angle at which the imagined tangential planes 15, 15' stand in relation to straight line g. These tangential planes have by definition the orientation of impact surface 12 along the straight line on which the contact of impact surface 12 begins on the knee-shin area. Angles $\alpha_1$ designate the intersecting angle of those tangential surfaces which influence the outer knee-shin area, angles $\alpha_2$ designate the intersection angles of those tangential surfaces which influence the inner knee-shin area.

In the embodiment shown here, knee airbag 10 is formed symmetrically, which means that angles α affecting leg $B_a$ (nearer the outside of the vehicle) are equal to angles α affecting leg $B_i$ (nearer the centre console). Angle $\alpha_1$ (outer side of the knee-shin area) is between 15° and 75°, preferably between 35° and 55°. Angle $\alpha_2$ (inner side) lies in the same area and is preferably of the same size as angle $\alpha_1$. In order to relieve the shins, the degree of embrace should diminish towards the lower part of the shin.

The state of the art is shown in FIGS. 4 and 5 in order to show the innovation described in the present document more clearly. Up to now it was proposed either (FIG. 3) to embrace the entire knee-shin area strongly, or (FIG. 4) to more or less completely avoid an embrace.

LIST OF REFERENCE NOS

10 Knee airbag
11 Base surface
12 Impact surface
14 Side surface
15, 15' Tangential surface
16 Capture tape
F Vehicle inner structure
M Inner side of centre console
S Front seat
a Distance
b Width
B Leg
f Longitudinal vehicle axis
g Straight line
α Angle

The invention claimed is:

1. A motor vehicle comprising:
two front seats, whereby a footwell is located in front of each front seat which is limited on a first side by vehicle inner structure and on the side lying opposite the first side by a center console,
a knee airbag located in each footwell, whereby the completely filled knee airbag, free of outside forces, exhibits a certain maximum width horizontally and perpendicularly to the longitudinal axis of the vehicle,
wherein each knee airbag is arranged in a respective footwell in such a way that its maximum width in an inflated state is larger than the available separation between the vehicle inner structure and the center console.

2. The motor vehicle according to claim 1, wherein the maximum width is at least 30 mm greater than the separation between the vehicle inner structure and the center console.

3. The motor vehicle according to claim 1, wherein the knee airbag is formed and positioned in such a way that in its fully inflated state its impact surface embraces the knee-shin areas of the relevant vehicle occupants in part at least on the outside.

4. The motor vehicle according to claim 3, wherein the knee airbag is formed and positioned in such a way that in the case of a 50% H III Dummy in standard seating position, at least tangential surfaces of impact surfaces which are allocated to the outer upper knee-shin areas respectively include a first angle of between 15° and 75° with a straight line running horizontally and perpendicularly to vehicle longitudinal axis.

5. The motor vehicle according to claim 3, wherein the knee airbag is formed and positioned in such a way that with a 50% H III Dummy in standard seating position, the impact surface also embraces the inner knee-shin areas.

6. The motor vehicle according to claim 2, wherein the knee airbag is formed and positioned in such a way that in its fully inflated state its impact surface embraces the knee-shin areas of the relevant vehicle occupants in part at least on the outside.

7. The motor vehicle according to claim 4, wherein the knee airbag is formed and positioned in such a way that with a 50% H III Dummy in standard seating position, the impact surface also embraces the inner knee-shin areas.

8. The motor vehicle according to claim 1, wherein the width of the knee airbag in the inflated and unrestricted state is at least 30 mm greater than the available separation between the vehicle inner structure and the center console.

9. The motor vehicle according to claim 1, wherein the width of the knee airbag in the inflated and unrestricted state is between 30 mm and 100 mm greater than the separation distance.

10. A motor vehicle comprising:
a structure supporting internal door cladding;
a center console spaced apart and separated from the internal door cladding;
a seat disposed between the internal door cladding and the center console; and
a knee airbag actuable from a relaxed state to a deployed state in a direction substantially toward the seat and including a width in an inflated and unrestricted state measured in a direction substantially perpendicular to the direction of deployment that exceeds a distance between the internal door cladding and the center console, the knee airbag reacting against at least one of the door cladding and the center console in the deployed state to form a first region of increased thickness adjacent to the at least one of the door cladding and the center console.

11. The motor vehicle according to claim 10, wherein the width of the knee airbag in the inflated and unrestricted state is at least 30 mm greater than the distance between the internal door cladding and the center console.

12. The motor vehicle according to claim 10, wherein the width of the knee airbag in the inflated and unrestricted state is between 30 mm and 100 mm greater than the separation distance.

13. The motor vehicle according to claim 1, wherein the knee airbag reacts against at least one of the vehicle inner structure and the center console to create a region of increased thickness adjacent to the at least one of the vehicle inner structure and the center console in the inflated state.

14. The motor vehicle of claim 1, wherein the knee airbag reacts against both of the vehicle inner structure and the center console to create regions of increased thickness proximate to the vehicle inner structure and the center console in the inflated state.

15. The motor vehicle of claim 1, further comprising at least one capture tape disposed at a central region of the knee airbag to provide the knee airbag with regions of increased thickness proximate to the vehicle inner structure and the center console in the inflated state.

16. The motor vehicle of claim 1, wherein the knee airbag includes a substantially uniform depth in a direction of deployment when free of outside forces and an increased depth at first and second ends when reacted by the vehicle inner structure and the center console, respectively.

17. The motor vehicle of claim 1, wherein the vehicle inner structure and the center console are disposed laterally relative to the knee airbag and react against respective first and second ends of the knee air bag to displace the first and second ends further toward an occupant when compared to a central portion of the knee air bag.

18. The motor vehicle of claim 10, wherein the knee airbag reacts against the other of the door cladding and the center console in the deployed state to form a second region of increased thickness adjacent to the other of the door cladding and the center console.

19. The motor vehicle of claim 10, further comprising at least one capture tape disposed at a central region of the knee airbag to provide the knee airbag with regions of increased thickness proximate to the door cladding and the center console in the deployed state.

20. A motor vehicle comprising:
 a structure supporting internal door cladding;
 a center console spaced apart and separated from the internal door cladding;
 a seat disposed between the internal door cladding and the center console; and
 a knee airbag actuable from a relaxed state to a deployed state in a direction substantially toward the seat, the knee airbag including a first end reacting against the door cladding in the deployed state and a second end reacting against the center console in the deployed state to displace the first and second ends further toward the seat when compared to a central portion of the knee airbag.

21. The motor vehicle of claim 20, further comprising at least one capture tape disposed at a central region of the knee airbag to provide the knee airbag with regions of increased thickness proximate to the door cladding and the center console in the deployed state.

* * * * *